Aug. 5, 1952  P. B. BURHANS  2,605,864
THREE-WAY HYDRAULIC CYLINDER FOR HYDRAULIC BRAKES
Filed Oct. 18, 1950
Fig.1.
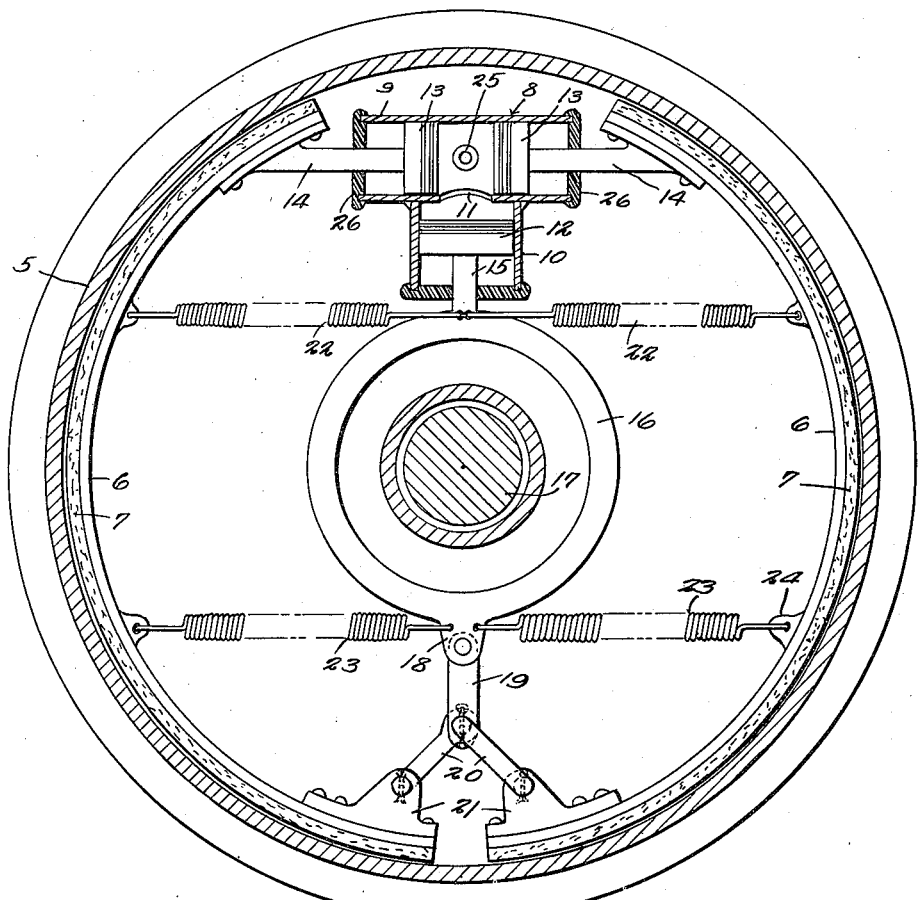
Fig.2.
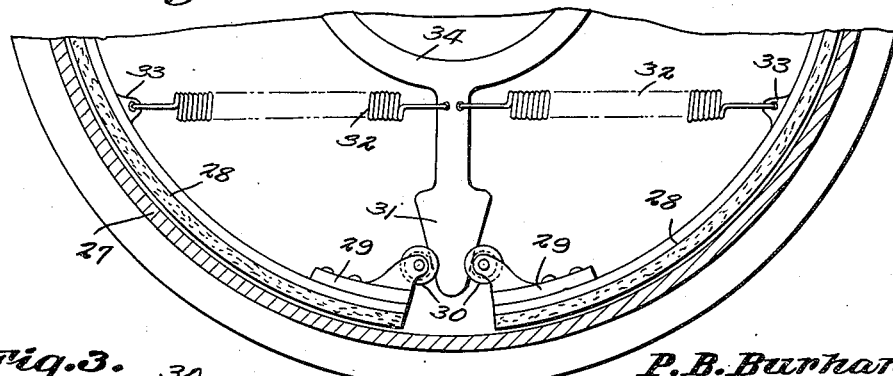
Fig.3.
P. B. Burhans
INVENTOR
BY C. A. Snowles.
ATTORNEYS.

UNITED STATES PATENT OFFICE 2,605,864

THREE-WAY HYDRAULIC CYLINDER FOR HYDRAULIC BRAKES

Paul B. Burhans, Miami, Fla.

Application October 18, 1950, Serial No. 190,711

1 Claim. (Cl. 188—152)

This invention relates to brake construction wherein brake shoes are expanded into contact with a brake drum, by hydraulic means, to brake the wheel of which the brake drum forms a part.

The primary object of the invention is to provide means whereby the brake shoes will be uniformly expanded or forced against the brake drum, insuring an effective braking of the wheel, and at the same time preventing uneven wear of the brake lining, due to the brake operating pressure being applied at one point.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is a sectional view through a brake drum and brake, illustrating an operating means constructed in accordance with the invention.

Fig. 2 is a fragmental sectional view through a brake drum illustrating a modified form of the invention.

Referring to the drawing in detail, the reference character 5 indicates a brake drum, and the reference character 6 indicates brake shoes which are supplied with the usual brake lining 7 that cooperates with the brake drum in braking the wheel, of which the brake drum forms a part.

The invention embodies a three-way hydraulic cylinder indicated generally by the reference character 8, which cylinder comprises the horizontal section 9 and the vertical section 10, the horizontal section 9 communicating with the vertical section 10, through the opening 11 disposed at a point intermediate the ends of the section 9. As shown, the section 10 is substantially larger in diameter than the horizontal section, and is provided with a piston 12 that operates therein.

Pistons 13 are mounted in the horizontal section 9, the rods 14 of the pistons 13 being riveted to the brake shoes 6 at opposite sides of the brake drum 5, adjacent to the upper ends of the brake shoes, as shown by Fig. 1 of the drawing.

The piston rod 15 on which the piston 12 is mounted, connects with the ring 16, the ring 16 encircling the axle 17 on which the wheel, not shown is mounted.

Extending from the ring 16 is the ear 18 to which the arm 19 is connected, the arm 19 having pivotal connection with the links 20 that extend in opposite directions and connect with the bearing members 21 that are secured to the shoes 6, at points adjacent to the lower ends thereof. Upper coiled springs 22 connect with the upper portions of the shoes 6 at the outer ends of the springs, the inner ends of the springs being connected to the ring 16, at a point adjacent to the piston rod 15.

At the lower portion of the ring 16, springs 23 are provided, the springs 23 stretching across the drum, where they are connected to the ears 24 that extend inwardly from the brake shoes 6. Thus it will be seen that due to this construction, the springs 22 and 23 normally operate to draw the brake shoes inwardly.

The reference character 25 indicates an opening in the wall at the cylinder 8, into which brake fluid is forced in the usual and well known manner, by the operation of the master cylinder of a hydraulic brake system, not shown.

The outer ends of the cylinders are closed by means of the rubber discs 26 to exclude foreign matter which would impair the efficient operation of the pistons.

In the form of the invention as shown by Fig. 2 of the drawing, the brake drum is indicated by the reference character 27, and the separable brake shoes operating therein, are indicated by the reference character 28.

Bearings 29 are secured to the lower ends of the brake shoes 28 and support the grooved rollers 30 through which the wedge-shaped member 31 moves to expand the lower ends of the brake shoes in the same manner as the mechanism shown at 19 and 20 of Fig. 1 of the drawing.

The coiled springs 32 connect with the shank of the member 31 and have their outer ends connected to the shoes at 33, to normally draw the lower ends of the brake shoes inwardly.

It will be understood that the ring 34 of which the member 31 forms a part, is moved vertically by a structure identical with the structure shown in Fig. 1 of the drawing, and which includes the horizontal cylinder 9 and vertical cylinder 10, together with the pistons which move therein.

In the operation of the device, it is obvious that when braking fluid is forced into the three-way cylinder, by the usual master piston of a hydraulic braking system, the pistons will be moved in opposite directions, to expand the brake shoes evenly throughout their lengths, thereby distributing wear on the brake bands or lining of the brakes to reduce wear at a particular point, which is the result of applying the brakes or brake shoes at the upper ends thereof, as is customary in the conventional type of hydraulic brake shoe operating mechanism.

Having thus described the invention, what is claimed is:

In a fluid brake, an axle, a fixed support, a rotatable drum surrounding the fixed support and axle, a pair of brake shoes mounted on the fixed support cooperating with said rotatable drum in braking movement of the rotatable drum, a three-way hydraulic cylinder including pistons mounted on the fixed support, comprising communicating horizontal cylinders and a vertical cylinder disposed at right angles with respect to the horizontal cylinder, communicating with the horizontal cylinder, said vertical cylinder being of a diameter appreciably greater than the diameters of the horizontal cylinders, pistons operating in the cylinders, a bearing ring surrounding the axle in spaced relation therewith, bearing members mounted on the lower ends of the brake shoes, a piston rod connected between the piston operating in the vertical cylinder and said ring, links connected between said ring and said bearing members spreading the lower ends of the brake shoes against the rotatable drum as the piston in the vertical cylinder moves downwardly, means for connecting the pistons operating in the horizontal cylinders to the upper ends of the shoes and said cylinders having an opening through which fluid is directed to the cylinders operating said pistons simultaneously.

PAUL B. BURHANS.

REFERENCES CITED

The following references are of record in the file of this patent:

UNITED STATES PATENTS

| Number | Name | Date |
|---|---|---|
| 2,250,248 | Berglund | July 22, 1941 |
| 2,389,405 | Birchfield | Nov. 20, 1945 |
| 2,501,578 | Pointer | Mar. 21, 1950 |